United States Patent
Yang et al.

(10) Patent No.: US 12,298,050 B2
(45) Date of Patent: May 13, 2025

(54) METHOD OF DIAGNOSING DEVICE HAVING ICE MAKING FUNCTION AND SERVER IMPLEMENTING SAME

(71) Applicant: LG Electronics Inc., Seoul (KR)

(72) Inventors: Younghun Yang, Seoul (KR); Seo Hyun Han, Seoul (KR); Junsoo Han, Seoul (KR); Cholok Han, Seoul (KR); Hongshin Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 17/896,894

(22) Filed: Aug. 26, 2022

(65) Prior Publication Data

US 2023/0266043 A1  Aug. 24, 2023

(30) Foreign Application Priority Data

Feb. 18, 2022 (KR) .................. 10-2022-0021507

(51) Int. Cl.
*F25C 1/00* (2006.01)

(52) U.S. Cl.
CPC ............ *F25C 1/00* (2013.01); *F25C 2600/04* (2013.01); *F25C 2700/02* (2013.01)

(58) Field of Classification Search
CPC .......................... F25D 29/008; F25C 2600/04
See application file for complete search history.

(56) References Cited

U.S. PATENT DOCUMENTS

| 8,970,205 | B2 * | 3/2015 | Janecek | G01R 33/072 324/207.13 |
| 9,273,892 | B2 * | 3/2016 | Lee | F25C 5/08 |
| 10,139,146 | B2 * | 11/2018 | Park | F25C 1/04 |
| 10,401,071 | B2 * | 9/2019 | Knatt | F25C 1/25 |
| 10,582,785 | B2 * | 3/2020 | Purliyev | A47J 31/20 |
| 10,788,249 | B2 * | 9/2020 | Saito | F25D 23/067 |
| 10,833,565 | B2 * | 11/2020 | Saito | F25C 5/06 |
| 10,837,687 | B2 * | 11/2020 | Cordon | F25C 5/20 |

(Continued)

FOREIGN PATENT DOCUMENTS

| EP | 2687796 | 10/2018 |
| EP | 3599437 | 1/2020 |

(Continued)

OTHER PUBLICATIONS

Extended European Search Report in European Appln. No. 22193425.0, mailed on Jul. 4, 2023, 9 pages.

(Continued)

*Primary Examiner* — Filip Zec
(74) *Attorney, Agent, or Firm* — Fish & Richardson P.C.

(57) ABSTRACT

Provided herein are methods of diagnosing an electronic device having an ice making function, the method comprising: receiving, by a server, data related to water supply and ice making from the electronic device; based on receiving the data, checking, by the server, one or more of water pressure state, an ice making state, or an ice usage state of the electronic device; based on the checked state, diagnosing, by the server, the electronic device to be in a low water pressure state or an insufficient water supply state; and based on the diagnosis, activating, by the server, a repair-inspection service for the electronic device, or providing a notification service to a user terminal corresponding to the electronic device.

15 Claims, 10 Drawing Sheets

(56) References Cited

U.S. PATENT DOCUMENTS

| | | | |
|---|---|---|---|
| 11,371,766 B2* | 6/2022 | Kang | F25C 5/06 |
| 11,668,521 B2* | 6/2023 | Han | G05B 23/0259 |
| | | | 702/183 |
| 12,013,167 B2* | 6/2024 | Lee | F25C 1/10 |
| 2006/0248903 A1 | 11/2006 | Heald et al. | |
| 2010/0031679 A1* | 2/2010 | Park | F25C 1/04 |
| | | | 62/137 |
| 2014/0070951 A1 | 3/2014 | Shim et al. | |
| 2015/0198937 A1 | 7/2015 | Wait | |
| 2016/0201980 A1 | 7/2016 | Kang et al. | |
| 2019/0331409 A1* | 10/2019 | Jung | H04L 12/2825 |
| 2020/0305107 A1 | 9/2020 | Chang et al. | |
| 2021/0356202 A1 | 11/2021 | Han et al. | |

FOREIGN PATENT DOCUMENTS

| | | |
|---|---|---|
| JP | 2022-002122 | 1/2022 |
| KR | 20190043258 | 4/2019 |
| KR | 20190076534 | 7/2019 |
| KR | 20190077771 | 7/2019 |
| KR | 102017087 | 10/2019 |

OTHER PUBLICATIONS

International Search Report in International Appln. No. PCT/KR2022/012792, mailed on Dec. 7, 2022, 3 pages.

* cited by examiner

METHOD OF DIAGNOSING DEVICE HAVING ICE MAKING FUNCTION AND SERVER IMPLEMENTING SAME

CROSS-REFERENCE TO RELATED APPLICATION

This application claims priority to and the benefit of Korean Patent Application No. 10-2022-0021507, filed on Feb. 18, 2022, the disclosure of which is incorporated herein by reference in its entirety.

TECHNICAL FIELD

The present disclosure relates to a method of diagnosing a device having an ice making function and a server implementing the same.

BACKGROUND

As performance of home appliances used in the kitchen improves, water purifying functions and ice making functions have been provided in refrigerators and water purifiers. Such home appliances (e.g., refrigerators, water purifiers) are usually supplied with water after being connected with a water supply source.

In some cases, home appliances that provide water purification/ice making functions such as refrigerators and water purifiers receive water from an external water supply, and performance limitations might occur depending on the water supply situation. For example, when water pressure is low or water supply is not adequately performed, the home appliance (e.g., a refrigerator, a water purifier) may not properly perform the water purifying/ice making function.

In some cases, users of the products are not aware of these problems and the service personnel who visit to repair the products are also unaware of these problems. Accordingly, a technical countermeasure to enable handling is required.

SUMMARY

The present application describes a method wherein a server is configured to diagnose a water pressure or water supply status of an electronic device having an ice making function in advance.

The present application also describes a method that improves the reliability of a diagnosis resulting from accumulating and storing data from a home appliance to check the water pressure/water supply status of the home appliance.

The present application further describes a method that includes a subsequent process when a problem in the water pressure/supply status of the electronic device is detected.

According to one aspect of the subject matter described in this application, a method of diagnosing an electronic device having an ice making function includes receiving, by a server, data related to water supply and ice making from the electronic device; based on receiving the data, checking, by the server, a one or more of water pressure state, an ice making state, or an ice usage state of the electronic device; based on the checked state, diagnosing, by the server, the electronic device to be in a low water pressure state or a poor water supply state; and based on the diagnosis, activating, by the server, a repair-inspection service for the electronic device, or providing a notification service to a user terminal corresponding to the electronic device.

Implementations according to this aspect can include one or more of the following features. For example, the method can further include, based on an operation time of an ice maker disposed in the electronic device, determining, by the server, whether to proceed to the checking of the water pressure state.

In some implementations, the diagnosing can include comparing, by the server, a water pressure of water supplied to the electronic device to a reference water pressure, and based on the water pressure being lower than the reference water pressure, diagnosing, by the server, the electronic device to be in a low water pressure state.

In some implementations, the method can further include collecting, by the server, water pressure data that is (i) received from a plurality of electronic devices, or (ii) received within a predetermined time period wherein an error report occurred from the electronic device, and generating, by the server, the reference water pressure based on the collected water pressure data.

In some implementations, the method can further include, based on a water supply error rate of an ice maker disposed in the electronic device being lower than a reference error rate, ending, by the server, the diagnosing of the electronic device.

In some implementations, the diagnosing can include comparing, by the server, a water supply amount of an ice maker disposed in the electronic device to a reference water supply amount, and based on the water supply amount being higher than the reference water supply amount, ending, by the server, the diagnosing of the electronic device.

In some implementations, the diagnosing can include comparing, by the server, an amount of ice made in an ice maker disposed in the electronic device for a predetermined time period to an amount of ice used in the electronic device, and based on the amount of ice made being greater than the amount of ice used, ending, by the server, the diagnosing of the electronic device.

In some implementations, the activating can include combining, by the server, customer information corresponding to the electronic device diagnosed to be in the low water pressure state or the poor water supply state; and providing, by the server, the combined information to a service center device.

According to another aspect, a method of diagnosing an electronic device having an ice making function can include receiving and storing, by the server, data related to water supply from a plurality of electronic devices; based on an error report occurring from a first electronic device from the plurality of electronic devices, identifying, by the server, a region in which the first electronic device is disposed; predicting, by the server, a number of error reports which will occur in the identified region based on data related to water supply from a second electronic device disposed in the identified region; and activating, by the server, a repair-inspection service or a notification service for electronic devices disposed in the identified region.

In some implementations, the identified region comprises an address of an apartment complex, and the method further includes, based on error reports occurring from electronic devices disposed in the apartment complex, receiving, by the server, data related to water pressure or data related to water supply from the electronic devices.

In some implementations, the activating further includes allocating, by the server, resources to be provided to the repair-inspection service based on the predicted number of error reports.

According to another aspect, a server configured to diagnose an electronic device having an ice making function includes a data loading module configured to receive data related to water supply and ice making from the electronic device; a diagnosis module configured, based on receiving the data, to check a water pressure state of the electronic device, an ice making state of the electronic device or an ice usage state of the electronic device, and configured, based on the checked state, to diagnose the electronic device to be in a low water pressure state or a poor water supply state; and a service module configured, based on the diagnosis, to activate a repair-inspection service or provide a notification service to a user terminal corresponding to the electronic device.

In some implementations, the diagnosis module is configured to compare a water pressure of the electronic device to a reference water pressure, and based on the water pressure being lower than the reference water pressure, diagnose the electronic device to be in a low water pressure state.

In some implementations, the diagnosis module is configured to compare an amount of water supply to an ice maker of the electronic device to a reference water supply amount, and based on the amount of water supply being higher than the reference water supply amount, end the diagnosis of the electronic device.

In some implementations, the diagnosis module is configured to compare an amount of ice made in an ice maker of the electronic device in a predetermined time period to an amount of ice used in the electronic device, and based on the amount of ice made being greater than the amount of ice used, end the diagnosis of the electronic device.

In some implementations, the service module is configured, based on the electronic device being diagnosed to be in a low water pressure state or a poor water supply state, to combine customer information corresponding to the electronic device to a low water pressure diagnosis or a water supply error diagnosis, or provide the combined information to a service center device.

DETAILED DESCRIPTION

Figure 1:
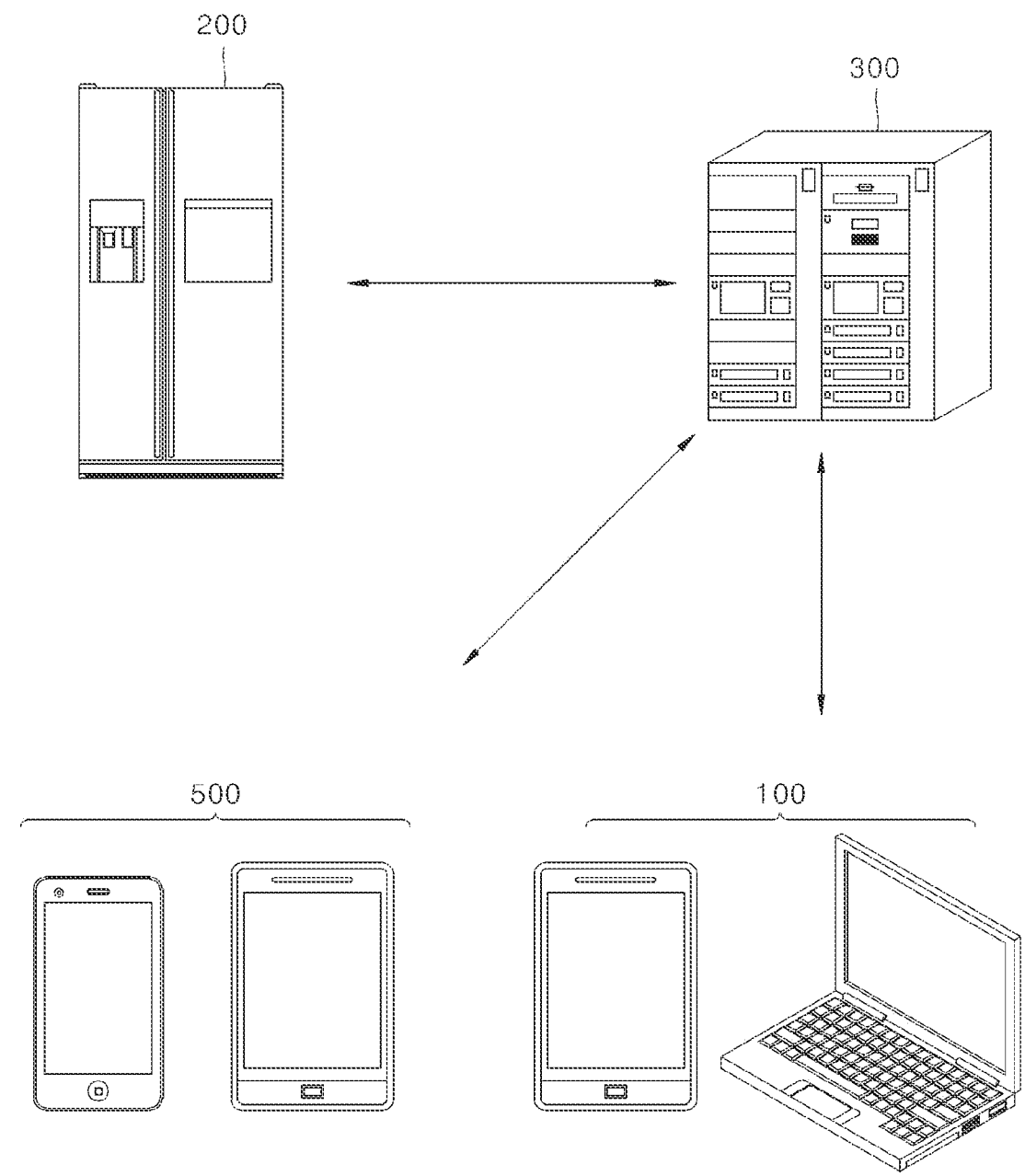
FIG. 1 is a schematic diagram showing an example overall configuration of an electronic device, a server, a service engineer terminal and a user terminal.

Hereinafter, one or more implementations of the present disclosure will be described in detail with reference to the accompanying drawings. The present disclosure may be implemented in various ways and may not be limited to implementations described herewith.

The above-described aspects, features and advantages are specifically described herein with reference to the accompanying drawings such that one having ordinary skill in the art to which the present disclosure pertains can easily implement the technical scope of the disclosure. In the disclosure, detailed descriptions of known technologies in relation to the disclosure are omitted if they are deemed to make the gist of the disclosure unnecessarily vague. In the drawings, identical reference numerals can denote identical or similar components.

It will be understood that although the terms first, second, A, B, (a), (b), etc. may be used herein to describe various elements, these elements should not be limited by these terms. These terms are generally only used to distinguish one element from another. It will be understood that when an element is referred to as being "connected with" or "coupled to" another element, the element can be directly connected with the other element or intervening elements may also be present. In contrast, when an element is referred to as being "directly connected with" another element, there are no intervening elements present.

In implementing the present disclosure, elements may be subdivided for convenience of description, but these elements may be implemented on device or module or one element may be divided into a plurality of devices or modules.

Hereinafter, an electronic device described below can include a home appliance. In some cases, an electronic device can be a refrigerator, a water purifier, or an ice maker that is connected to a water supply source in a house, office or commercial facility and configured to provide functions including a water supply function and ice making function.

In some implementations, the electronic device can include a refrigerator having an ice making water purifier and the like, and for the convenience of description below, examples of the refrigerator having the ice making water purifier will be mainly described. However, the electronic device according to the present disclosure may not be limited thereto.

In some cases, a server can analyze patterns and main data about a user using an ice making water purifier, a refrigerator and an ice maker, and identify problems in water supply based on the analysis of patterns and main data. The server can transmit a message including notification of errors and acceptances of SVC (after-sales service). In addition, the server can provide a SVC engineer with information of an accurate repair guide so that the SVC engineer can repair the water supply error within a short time.

Since a problem can occur due to a poor water supply, the server can provide logic configured to accurately detect a problem and identify the characteristics of data.

FIG. 1 is a schematic diagram showing an example overall configuration of an electronic device, a server, a service center device and a user terminal.

The electronic device 200 can include an electric appliance configured to provide an ice making function using a water supply, such as an ice making water purifier, a refrigerator having an ice making water purifying function or the like.

The service center device 100 can be a device for repair-inspection that is used for communicating with the service center (e.g., after-sales service center) or used by a person in charge of repair-inspection.

The user terminal device (500, hereinafter, the user terminal) (e.g., a mobile phone and a tablet) can be a device used by the user using the electronic device 200. The user can receive information related to the electronic device 200 or request checking and repairing through the user terminal.

In some examples, the server 300 can include both one server configured to perform various functions and another server group consisting of a plurality of servers. As one example, the server 300 can be one server group comprising sub-servers including a data loading server configured to collect data from the electronic device 200, a diagnostic server configured to perform a diagnosis, a service server for customer service, and a customer information loading server configured to store customer information.

In some examples, the server 300 can include a plurality of modules configured to provide the above-described functions. Each module can correspond to one or more servers or an element provided in one server.

Figure 2:
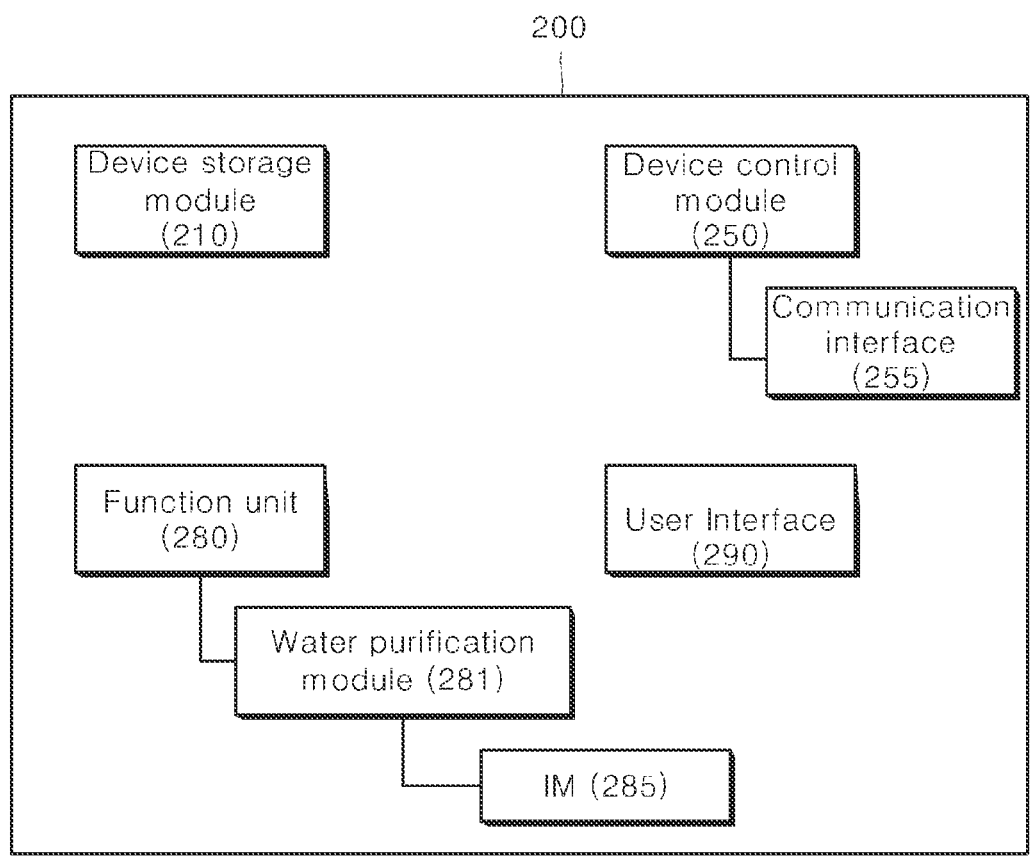
FIG. 2 shows an example configuration of an electronic device.

FIG. 2 shows an example configuration of an electronic device.

In some implementations, the electronic device 200 can include electric home appliances configured to receive water from an external water supply source to perform an ice making function such as a refrigerator, a water purifier and the like. The electronic device 200 can include a device storage module 210 having software necessary to perform a predetermined function and store data while the electronic device 200 performs functions.

The electronic device 200 can further include a device control module 250 configured to control the predetermined functions and process or transmit various data stored in the electronic device 200 to the server 300. The configuration of the electronic device 200 may not be limited to the configuration shown in FIG. 2 and various other elements can be provided in the electronic device 200.

A function unit 280 can include components configured to perform specific functions of the electronic device 200. For example, when the electronic device 200 is a refrigerator, the components of the function unit 280 can include a compressor, a motor, etc. having a refrigerating/freezing function. When the electronic device 200 is a water purifier, the function unit 280 can include components configured to perform water purifying and water supply. In particular, the electronic device 200 can include a water purification module 281. The water purification module 281 can include an ice maker (hereinafter, IM) 285 providing an ice making function.

In some examples, the device control module 250 can be configured to control the function unit 280, and check, receive or transmit predetermined data via communication with the server 300.

The device control module 250 can include a communication interface 255 as a sub-component. The device control module 250 can transmit data or information with the server 300 via the communication interface 255. One example of the communication interface 255 can include a modem.

The elements shown in FIG. 2 can communicate with each other.

In some implementations, the device control module 250 can control the overall operation of the electronic device 200. For example, the device control module 250 can be a microcomputer (Micom). Alternatively, the device control module 250 can be implemented based on firmware. Or, the device control module 250 can include one or more processors.

In some cases, the device control module 250 can include a processor and an internal memory. A plurality of device control modules 250 can be provided according to the functions of the electronic device 200 that is an electric home appliance.

The device control module 250 can include one or more of a central processing unit (CPU), an application processor or a communication processor. The device control module 250 can be implemented based on firmware to execute one or more commands related to the control of the electronic device 200.

In some implementations, a device storage module 210 can include an internal memory and the internal memory can be a volatile and/or non-volatile memory. The internal memory can store firmware, one or more commands related to the control of the electronic device 200, and data generated in the electronic device 200 in a process of performing a function. Alternatively, the device storage module can store data transmitted by the server 300.

In some cases, the communication interface 255 can perform communications with the server.

Specifically, the communication interface 255 can receive various data and programs from the server 300. The communication interface 255 can transmit data in a wired manner and/or wirelessly.

As one example, the communication interface 255 can be a short-range wireless communication module configured to implement short-range wireless communication. The short-range wireless communication module can be a wireless communication module performing communication based on Wireless Fidelity (WiFi), Bluetooth, radio frequency identification (RFID), infrared data association (IrDA), ultra-wideband (UWB), ZigBee or the like.

When the communication interface 255 is a short range wireless communication module, an access point can be provided in the user's residential space. The access point can be a device configured to relay wireless communication between the server 300 and the communication interface 255. As one example, when the communication interface 255 is a WiFi module, the access point may be a WiFi router.

As another example, the communication interface 255 can be a long-range wireless communication module configured to execute long-range wireless communication. The long-range wireless communication module can be a wireless communication module performing communication based on code division multiple access (CDMA), frequency division multiple access (FDMA), time division multiple access (TDMA), orthogonal frequency division multiple access (OFDMA), single carrier frequency division multiple access (SCFDMA), 5G or the like.

In some cases, the communication interface 255 can correspond to a microcomputer controlling communication. The communication interface 255 can be implemented based on firmware.

The function unit 280 can be an element configured to implement unique functions provided by the electronic device 200. As one example, a unique function can include refrigerating, freezing, water-purifying, and ice making functions.

A user interface 290 can provide the user with information about an operation state of the electronic device 200. For example, the user interface 290 can include a display module and a speaker module. Meanwhile, the user interface 290 can receive an input of controlling the operation of the electronic device 200 from the user.

Figure 3:
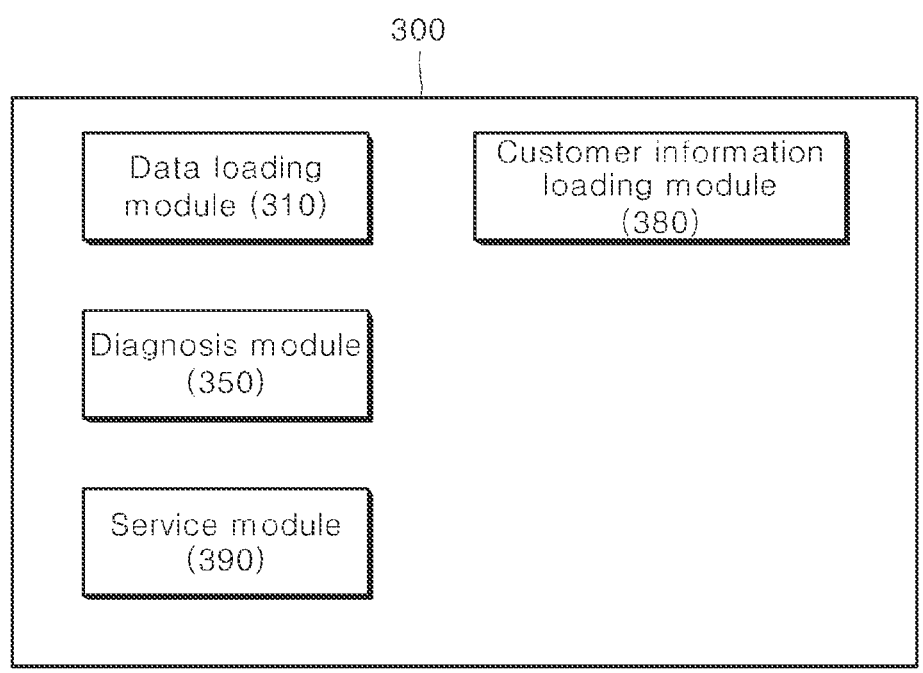
FIG. 3 shows an example configuration of a server.

FIG. 3 shows an example configuration of a server. As shown in FIG. 1, the server 300 can include one server or a group of servers including a plurality of servers. For example, if the server includes one server, the server 300 may be configured of sub-modules configured to perform tasks related to data loading, customer information loading, diagnosis and service.

If the server includes a plurality of servers, one or more servers can perform each of the above-described tasks, or one server can perform two or more tasks. When the tasks are distributed to the plurality of servers, a dedicated communication network can be used among the servers for security. Alternatively, each server can communicate via the internet or the like using an encrypted communication channel.

In some implementations, a data loading module 310 may receive and store data related to water supply and ice making from the electronic device 200. A diagnosis module 350 may check a water pressure state, an ice making state or an ice usage state of the electronic device 200 based on the data received by the data loading module 310, and diagnose whether the electronic device 200 is in a low water pressure state or a poor water supply state based on the data.

A service module 390 can activate a repair-inspection service for subsequent processing based on a diagnosis of the electronic device or provide a notification service to the user terminal 500 related to the electronic device 200.

Each of the modules may be a component of one server or may be a separate server. In the latter case, a group of multiple servers can be provided to implement one example of the present disclosure.

Figure 4:
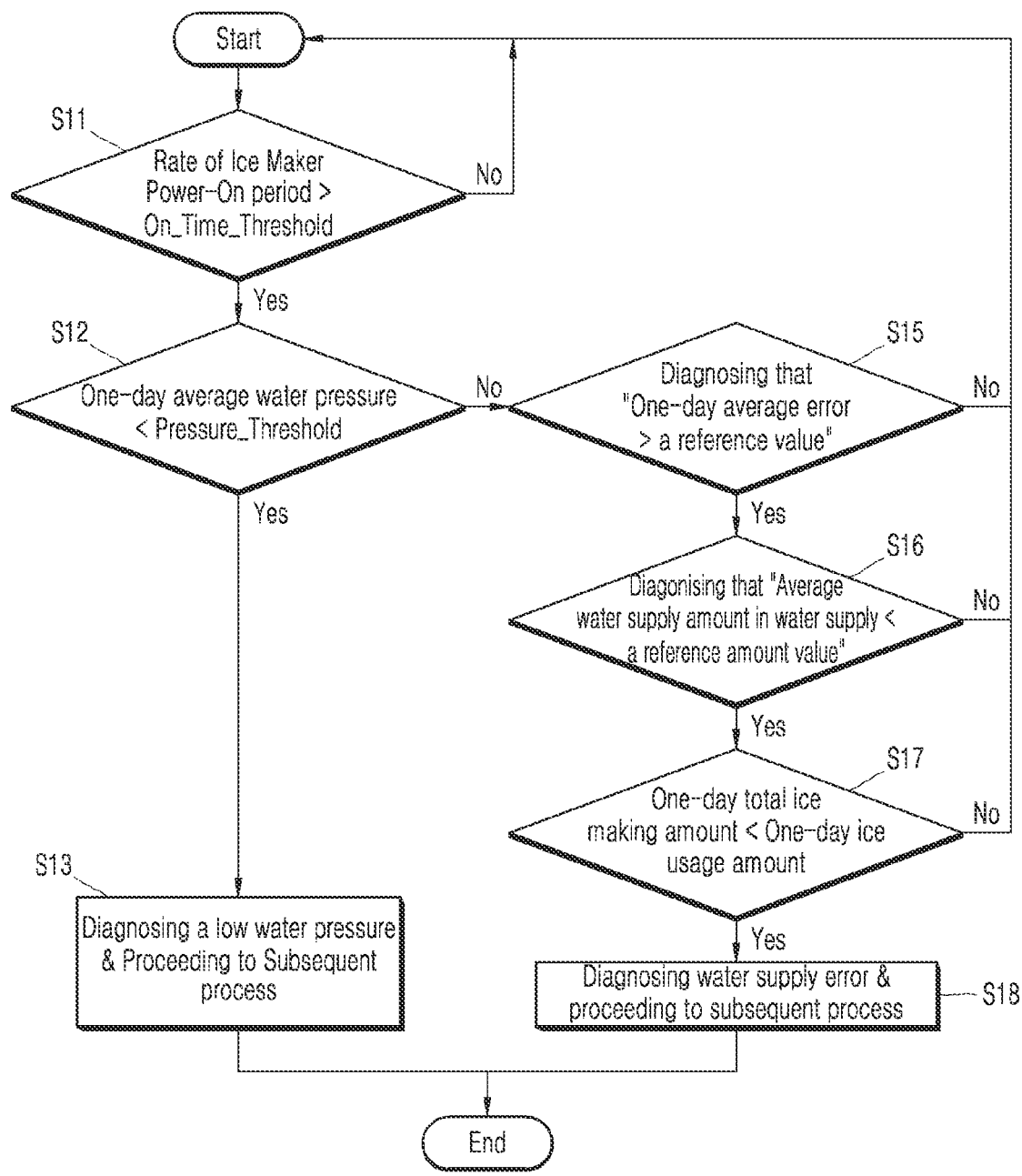
FIG. 4 is a view illustrating an example process of accumulating and diagnosing a usage pattern of an electronic device.

FIG. 4 is a view illustrating an example a process of accumulating and diagnosing a usage pattern of an electronic device.

For example, FIG. 4 shows an operation of the server 300 receiving data related to water supply and ice making from the electronic device 200; an operation of the server 300 checking a water pressure state, an ice making state or an ice usage state of the electronic device 200 based on the received data.

In addition, FIG. 4 shows an operation of the server 300 diagnosing whether the electronic device 200 is in a low water pressure state or a poor water supply state based on the checked state; an operation of the server 300 activating a repair-inspection service or providing a notification service to the user terminal 500 so as to perform a subsequent process based on the diagnosis of the electronic device 200.

In some implementations, the data loading module (or data loading server) 310 can be responsible for data receiving. The diagnosis module (or diagnosis server) 350 can be responsible for checking and diagnosis. The service module (or service server) 390 can be responsible for activating the repair-inspection service or providing the notification service.

In some cases, the diagnosis can be determined based on an operation time IM Work Time of the IM module provided in the electronic device, a daily average water pressure, a water supply failure error rate, an average water supply amount, an ice making amount and the like.

The server 300 can accumulate and store data continuously generated by the electronic device 200. In this instance, the data generated by the electronic device 200 can include identification information of the electronic device in order to protect personal information and may not include personal information about the user of the electronic device 200. Hereinafter, proceeding determination shows a process of diagnosing an error or a low water pressure based on data accumulatively stored by the server 300.

In the process of the server diagnosing the performance of ice making function provided in the electronic device, the server 300 can determine whether to proceed with the checking operation based on the operation time of the ice maker provided in the electronic device 200.

For example, the server 300 can check a time period when the IM 285 is powered on for a predetermined time period (e.g., one day, morning/afternoon or one week, etc.), and identify whether the checked time period is greater than a preset threshold On_Time_Threshold (S11). On_Time_Threshold can be a ratio of a time required for diagnosis for the ice maker to the total diagnosis time. The server 300 can generate On_Time_Threshold based on a statistical value of the usage time of all electronic devices.

In some cases, the server 300 can generate On_Time_Threshold based on a statistical value of a usage time of all electronic devices for which an error or complaint is received. In some examples, On_Time_Threshold may be 90%, 80% or the like. That period may vary depending on the season. In summer when ice consumption is high, the server 300 may set On_Time_Threshold to 90%. In winter, when ice consumption is low, the server 300 may set On_Time_Threshold to 70%.

If a power-on rate of the ice maker in S11 is less than On_Time_Threshold, the server 300 can end the diagnosis of the current cycle corresponding to the electronic device 200 and wait until the diagnosis time of the next cycle, or the server 300 can end the diagnosis of the corresponding electronic device and start a new diagnosis of another electronic device.

As one example, the server can diagnose electronic devices in a one-day cycle for a one-day period. Or, the server 300 can diagnose electronic devices in a 12-hour period in summer when ice consumption is high. In addition, the server 300 can diagnose electronic devices every 15 hours for a 14-hour period during the morning to night time zones, and may not perform separate diagnosis for the remaining 9 hours from the night to the morning.

In some cases, S11 can include a previous operation of determining whether the electronic device requires a separate diagnosis. Thereafter, the server 300 can proceed to S12 when it is determined in S11 that the power-on rate of the ice maker is greater than On-Time_Threshold.

Hence, the server 300 can compare the water pressure data provided to the electronic device with the reference water pressure stored in the server 300. When the water pressure data is lower than the reference water pressure, the server 300 can diagnose that the electronic device 200 is in a low pressure state.

As one example, the server 300 can diagnose whether the average daily water pressure of the electronic device 200 is equal to or less than the reference water pressure Pressure_Threshold (S12). Pressure_Threshold can be the reference water pressure set by the server to a specific water pressure level, and can be set based on water pressure patterns of various electronic devices. In some cases, the server 300 can accumulatively store the water pressure at the time when a user's complaint is received, so that the server 300 can set the reference water pressure based on the stored data. For example, Pressure_Threshold may be set to 1.5 but the present disclosure may not be limited thereto.

In some implementations, the server 300 may diagnose the electronic device to be in a low water pressure state when the average water pressure is less than the reference water pressure (S13). The server 300 can proceed to a subsequent process related to the low water pressure in the corresponding electronic device.

In some examples, the reference water pressure can be preset or generated as a new reference based on diverse information. For example, the server 300 can generate the reference water pressure based on water pressure data received from multiple electronic devices or an aggregation of water pressure data within a predetermined period of time with respect to the time at which the error report occurred. For example, when users recognizing inconvenience reports an error, the server 300 can set a reference water pressure based on water pressure data for the past N days (e.g., one week or one month) of the corresponding electronic device.

In the process of accumulating the water pressure data, the server 300 can reflect regional information in which each electronic device is disposed. When error reports are received from a specific building such as a specific apartment or villa, the water pressure in the building may be low. The server may reflect this and may set the reference water pressure of the corresponding area only or building separately.

When the average water pressure is equal to or less than the reference water pressure, the server 300 can perform specific diagnosis related to water supply failure. That is, the server 300 can end the diagnosis operation when the error rate (the error occurrence rate or the number of occurrences during a predetermined period, etc.) of the ice maker provided in the electronic device is less than the reference rate (or the number of occurrences, etc.).

In some implementations, the server 300 can diagnose whether an occurrence rate of water supply errors is equal to or higher than a reference value (S15). For example, the server 300 can diagnose whether an average water supply error occurrence is 50% or more. In S15, it may be checked whether a water supply error occurs even with a high water pressure. 50% is an exemplary criteria and this criteria may also be changed based on data provided by other electronic devices.

If the water supply error rate is equal to or less than a predetermined reference value, the server 300 can end the diagnosis of the current cycle for the corresponding electronic device 200 and wait until the diagnosis time of the next cycle. Alternatively, the server 300 can end the diagnosis of the corresponding electronic device and perform diagnosis for another electronic device.

When the water supply error rate is equal to or more than the reference value, the server 300 can diagnose the amount of water supply (S16). The server 300 can compare water supply amount data of the ice maker with a reference supply amount value stored therein. The server 300 can end the diagnosis operation when the water supply amount data is greater than the reference water supply amount. That means the water supply proceeds normally. In this instance, the reference water supply amount may be determined differently depending on the model of the electronic device 200 or it may be determined differently depending on the user's water usage.

More specifically, the server can compare an average water supply amount in the process of supplying water to the electronic device 200 with a reference amount (e.g., 80 g), and diagnose whether the average water supply amount is equal to or less than the reference water supply amount (S16). The reference water supply amount may be set differently depending on a model or usage pattern of the corresponding electronic device or information collected from other electronic devices. S16 is an operation in which the server 300 can determine whether the water supply amount of each electronic device 200 is equal to or less than the predetermined reference value to determine whether the water supply is poor or defective.

If the water supply amount is greater than the reference amount in S16, the server 300 can end the diagnosis of the current cycle for the electronic device 200 and wait until the diagnosis time of the next cycle. Alternatively, the server 300 can end the diagnosis of the corresponding electronic device and perform diagnosis of another electronic device.

If the water supply amount is equal to or less than the reference amount, the server 300 can diagnose the amount of ice making (S17). S17 may be a process in which the server 300 determines whether the user uses more ice than the amount of made ice, even though the electronic device 200 is capable of performing the ice making function at least in the amount of water supply.

The server 300 can compare the amount of the ice made in the ice-maker of the electronic device 200 in a preset period of time with the ice usage amount of the electronic device 200. When the amount of made ice is greater than the amount of ice usage, there is a high possibility that a separate error report will not occur.

More specifically, the server 300 can compare the total amount of made ice with the amount of ice usage (S17). If the amount of ice usage is greater than the amount of made ice, the server 300 may diagnose that there is a water supply error and proceed to a subsequent process (S18). However, if the user uses less ice than the amount of made ice even with a small amount of water supply, the server 300 can end the diagnosis in the current cycle of the corresponding electronic device 200 and wait until a diagnosis time of the next cycle. Alternatively, the server 300 can end the diagnosis of the corresponding electronic device and perform diagnosis of another electronic device.

The subsequent process of S18 can include a process of activating the repair-inspection service.

In some implementations, the server 300 can transmit predetermined information about the electronic device, diagnosed to have low water pressure or a water supply error based on the process of FIG. 4, to the user terminal. When the user requests repair service to solve the low water pressure/supply error, the server 300 can provide information diagnosed in the process of FIG. 4 to a terminal used by a service agent who will provide the repair service.

In an example of FIG. 4, the data used by the server 300 in the diagnosis process can include a power state of the icemaker 285, the water pressure, poor water supply error code, ice usage of the electronic device 200 and water usage data. The server 300 can set a criteria for a usability pattern of a user who uses the corresponding electronic device 200 based on the above-described data, collect data for each electronic device 200, and define a "Threshold" value as a criterion for determination.

The server 300 can verify and correct a threshold value of specific usage patterns defined based on an artificial intelligence model (e.g., correlation analysis and T-SNE) or the like, or may change a threshold value based on environmental factors.

In case of a low water pressure environment and poor water supply to the ice maker, the server 300 can correct or change Pressure_Threshold, which can be a reference value for a water pressure.

The server 300 can diagnose whether there is a low water pressure environment and poor water supply to the icemaker. In case of a poor water supply to the icemaker, the server may determine Threshold values as reference values in the same way described above for the amount of ice made and the amount of ice used in the electronic device 200.

In addition, the server 300 can verify whether each reference value is appropriate for each electronic device 200, not maintaining the reference values as fixed. For example, when the number of electronic devices determined to be defective based on a specific reference value increases, such a result might be derived only for diagnosis rather than an actual product error and the server 300 may change the reference value accordingly.

If a number of error reports are received even when it is not determined as errors based on a specific reference value, the server can determine that the reference value is not suitable and the server 300 can then change the reference value.

Figure 5:
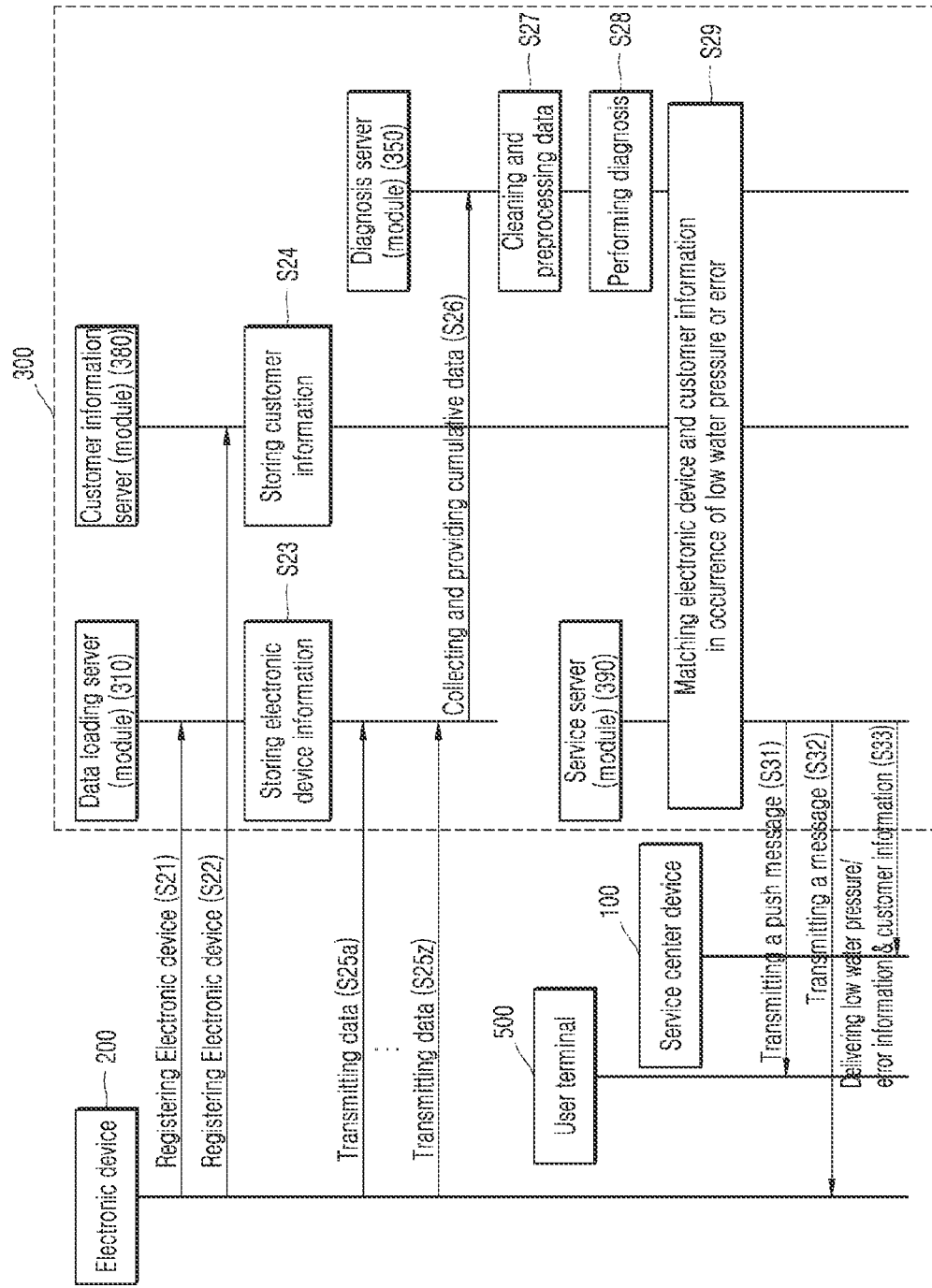
FIG. 5 shows an example interaction between an electronic device and a server.

FIG. 5 shows an example interaction between an electronic device and a server. In some cases, the server 300 can be a logical integration of a plurality of servers or modules. For example, each server or module can correspond to a logical individual component, and each server or module may be physically distributed or implemented in one device.

In some implementations, the electronic device 200 can perform electronic device registration for the first time (S21 and S22). Information except for identification information and personal information (e.g., region information in which the electronic device 200 is disposed, model information, etc.) can be stored in the data loading server 310 (S23).

The identification information and customer information of the electronic device 200 can be stored in the customer information loading server (or module) 380 (S24). In this process, a predetermined authentication procedure can be performed between the electronic device 200 and each module or server 300. In the registration process of the electronic device 200, the user terminal 500 can transmit customer information to the server 300.

After the first one-time registration, the electronic device 200 can continuously accumulate and store data, and transmit the data to the data loading server (or module) 310 in a predetermined period (S25*a* to S25*z*)

For example, the electronic device 200 can include a water pressure sensor configured to sense a water pressure. The water pressure sensor can continuously check the change state of the water pressure to calculate water pressure data. Alternatively, the electronic device 200 can calculate an average of the water pressure data sensed by the water pressure sensor for a predetermined period. The electronic device 200 can periodically transmit the water pressure data to the server 300.

Alternatively, the electronic device 200 can transmit the time when the IM 285 is in a power-on state to the server 300.

When a water supply error occurs, the electronic device 200 can transmit error data including a time at which the corresponding error occurred and an error code to the server 300. In some cases, the electronic device 200 can transmit error data to the server 300 whenever an error occurs. Or, the electronic device 200 can collect error data in a predetermined period and transmit the collected data to the server 300.

The electronic device 200 can store information on an average water supply amount, generate water supply data, and transmit the water supply data to the server 300.

The electronic device 200 can store information on the amount of ice making and the amount of used ice, and can generate and transmit the data on the amount of ice and the amount of used ice to the server 300.

The above-described data can be transmitted according to a transmission method at a time of execution of each function such as water supply, ice making and ice use or a periodic transmission method.

When certain data are accumulated and stored, the data loading server (or module) 310 can collect and provide the data to the diagnosis server (or module) (S26). The diagnosis server (or module) 350 can perform data purification and preprocessing (S27). Furthermore, the diagnosis server can perform diagnosis based on the process of FIG. 4 described above (S28).

In some implementations, data purification can be a process of removing abnormal data. For example, when receiving high water pressure data that could not occur at all, the diagnosis server (or module) 350 can remove this data to prevent the average water pressure from being excessively high. The criteria for data purification can also be maintained by the diagnosis server (or module) 350.

Data preprocessing can determine in which process each data is generated. For example, data may be preprocessed to be classified into the On/Off time of the ice maker, the water supply pressure (water pressure) of the electronic device 200, an error state (insufficient or poor water supply, etc.), the amount of ice use, or the amount of ice making. Some data may be preprocessed while being stored in the data loading serer (or module) 310. In some cases, the data loading server (or module) 310 can receive preprocessed data from the electronic device 200. The error state related insufficient or poor water supply may occur when the water is not sufficiently provided to the electronic device 200. The error state may occur because of mal-function or breakdown of water supply line. The error state may occur because of water shortage. The error state may occur because of water supply problem.

When it is determined based on a result of the diagnosis that a low water pressure or an error has occurred, the diagnosis server (or module) 310 can perform collaboration with the customer information loading server (or module) 380 to match the electric device and customer information (S29). S29 is a process configured to activate a repair-inspection service. The process can include controlling the server 300 to match low water pressure diagnosis or water supply error diagnosis and customer information corresponding to the electronic device 200, and providing the matched information to the service center device 100 corresponding to the customer information.

The service server (or module) 390 can transmit a push message to the user terminal 500 used by the user of the electronic device 200 in which the problem has occurred, and display information related to the low water pressure state or error state of the electronic device and an application for a related-repair service on the user terminal 500.

In addition, the service server (or module) 390 can transmit a predetermined message to the electronic device 200 (S32), and control the user interface 290 of the electronic device 200 to display the corresponding information so that the user can check it.

Meanwhile, the service server (or module) 390 can transmit the low water pressure/error information and the customer information to the service center terminal 100 so that the service center may repair or inspect the corresponding electronic device 200 (S33).

In some examples, data on a refrigerator having an ice making water purifier (hereinafter, an ice making water purifier refrigerator) can be loaded in the data loading server (or module) 310. Due to personal information issues, personal information and data generated by the electronic device 200 may be separately loaded.

The loaded data can be moved and transmitted to the diagnosis server (or module) 350, and the diagnosis server (or module) 350 can remove abnormal data. In addition, the diagnosis server (or module) 350 can classify data of customers who would receive the repair service and customers who would not. Accordingly, the diagnosis can be performed based on the data generated by the electronic device 200 that would receive the repair service. This classification may be based on policy and regional variables and may vary depending on external circumstances.

The diagnosis server (or module) 350 can preprocess and load the necessary data in a predetermined time period (e.g., one hour period) in order to improve the efficiency of data storage. Due to the data being loaded in units of one hour, the capacity of the server may be improved and the cost effect can be seen.

In some cases, the diagnosis server (or module 350) can check the diagnosed customer by the logic developed based on the data. The result can be transmitted to the service server (or module) 390 to match customer information and the diagnosed electronic device 200.

As one example, one channel can be AppPush that delivers a message for receiving repair/inspection, etc. to the user terminal 500 used by the customer, and another channel can transmit user information of the user who reported the low water pressure/error to the service center device 100 (e.g., a customer consultation or service system). When the customer requests repair/inspection, a customer counselor or call center staff can match the diagnosis result and customer's request to guide appropriate repair/inspection or action.

In some implementations, the occurrence of an error caused by a low water pressure environment can be solved in advance. In addition, the occurrence of an error caused by a poor water supply to the ice maker connected to the electronic device can be checked and solved in advance. Accordingly, users' complaints may be reduced and inspection-repair may be performed in advance before problems occur.

In some cases, it can be difficult to diagnose and confirm an error from the decrease in the amount of ice making due to a low water pressure environment of electronic devices such as ice making water purifier refrigerator. Also, it can be difficult to confirm errors even in the actual repair or inspection process. Accordingly, in some implementations, it is possible to accurately determine whether an error is present by checking past data (i.e., previously received and stored data) related to the water pressure and water supply of the corresponding electronic device.

The server 300 can set reference data for determining whether a low water pressure or poor water supply occurs based on data provided by the electronic device used by the customer who reported the error. The reference data can be used to accurately determine whether an error is present based on data related to the same error in the past.

The server 300 can store the measurements of water pressure, the amount of water use and the amount of ice use. Based on the stored information, the server 300 can set or update reference values by statistically classifying the reference values (e.g., frequency, average, etc.) at which errors occur.

Even after the first reference values are set, the server can reset the reference values based on data transmitted by electronic devices having errors that are not identified based on the reference values.

For example, when the reference water pressure was initially A but the water pressure data collected before a new report of an error occurs for a refrigerator is B, the server 300 may set B as the reference water pressure.

Similarly, a reference value for determining each of the operation time of the ice maker, the error rate, the amount of water supply, the amount of ice making and the amount of ice use can be variously set.

When a regional characteristic occurs, the above-described reference value can be set differently for the corresponding region.

For this purpose, when each electronic device continuously transmits data to the server 300, the server 300 can analyze the data and determine whether it has received data that would indicate an error. When the rate of transmission of the data indicating an error increases, the server can increase the frequency of monitoring for the corresponding electronic device or can reduce the diagnosis interval.

Figure 6:
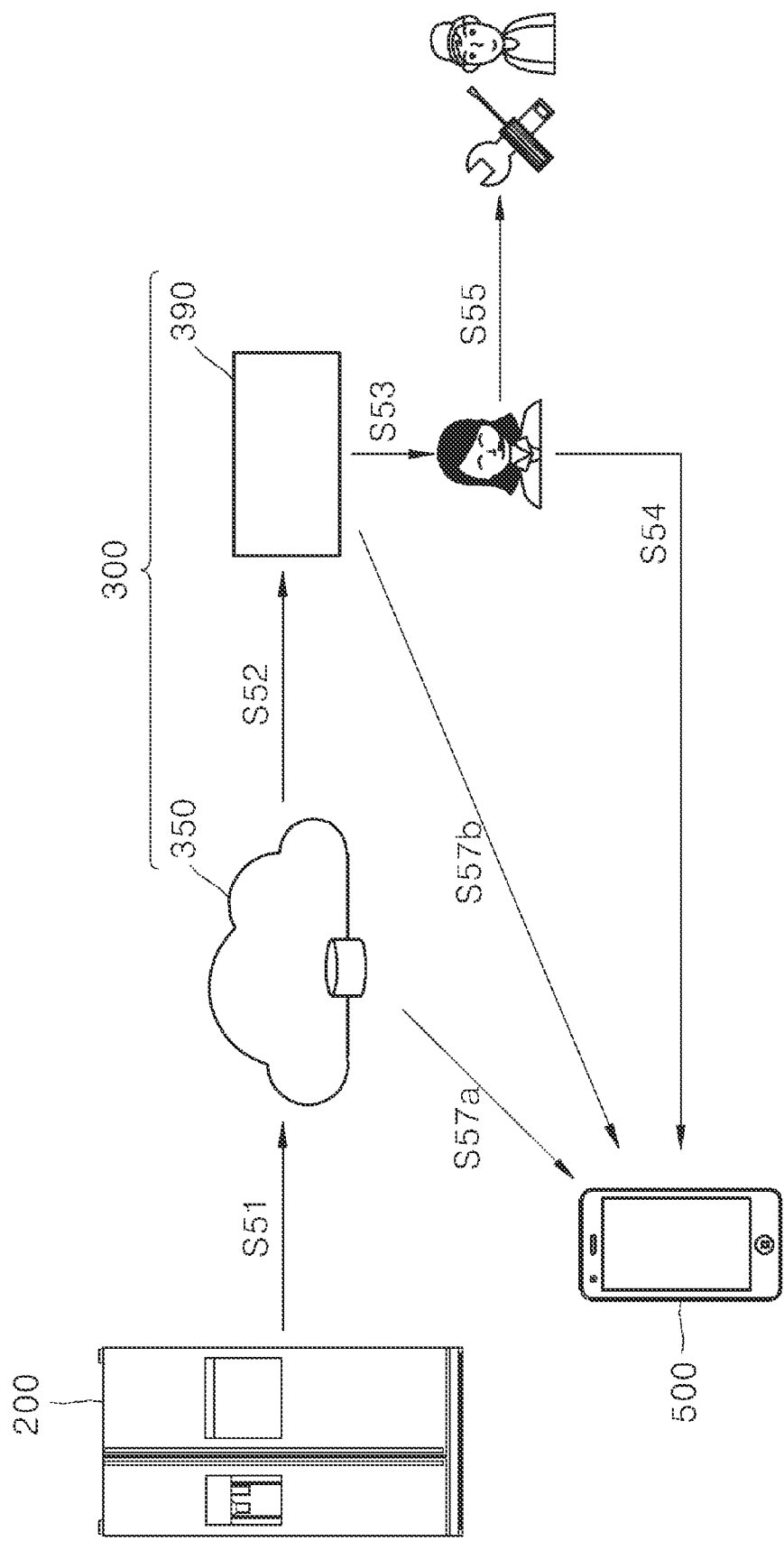
FIG. 6 shows an example process of transmitting data from an electronic device to a server.

FIG. 6 shows an example process of transmitting data from an electronic device to a server. An ice making water purifier refrigerator is shown as one implementation of the electronic device. A refrigerator 200 can monitor the components for a predetermined time interval (e.g., in seconds or minutes, etc.). after that, the refrigerator 200 can transmit data on the water pressure, the ice maker operation time, the amount of ice making, the amount of ice use and etc. to the server 300 or the diagnosis module (or diagnosis server) 350 (S51). The above-described data may be specially encoded for convenience or security of transmission.

In some cases, the monitoring of the components can be calculated by a water supply sensor, an ice making sensor, an ice extraction sensor provided in the ice maker. If the electronic device is a device other than the refrigerator (e.g., an ice making water purifier), the data that can be calculated by the corresponding device can be transmitted to the server 300 or the diagnosis module (or diagnosis server) 350. The transmission of S51 can be performed via WiFi.

In some implementations, the server 300 or the diagnosis module (or diagnosis server) 350 can compare and analyze the received data with the past data of the corresponding electronic device, and can transmit the received data to the service module (or service server) 390 of the call center in charge of dedicated-customer service (S52). The server 300 or the diagnosis module (or diagnosis server) 350 can determine and predict an abnormal state (e.g., a low water pressure, poor water supply) of the device based on the received data and other comparative data, or previous data of the corresponding product. When an abnormal state is diagnosed, information about the product and the abnormal state may be transmitted to the service module (or service server) 390 of the call center.

The service module (or service server) 390 of the call center can check whether an abnormal state occurs during an operation or all processes of the electronic device in which an error might occur based on the transmitted data. When an error or abnormal state occurs, the service module (or service server) 390 of the call center can control a notification message to be transmitted to a call center staff responsible for monitoring (S53).

The call center staff in charge of monitoring can send a phone call, text message or push message to the contact information of the owner of the device to transmit a solution to the error or abnormal state (S54), or can transmit information to a customer service (i.e., after-sales service) staff to repair the device (S55). S54 and S55 may be performed simultaneously to coordinate visits of the customer service staff with the device owner.

The service module (or service server) 390 or the diagnosis module 350 of the call center can transmit a push message to the user terminal used by the corresponding customer and notify that an error or abnormal state has occurred or an abnormal state might occur (S57*a*, S57*b*). Or, a push message may include identification information (e.g., URL, etc.) for content that may self-correct an abnormal state.

Figure 7:
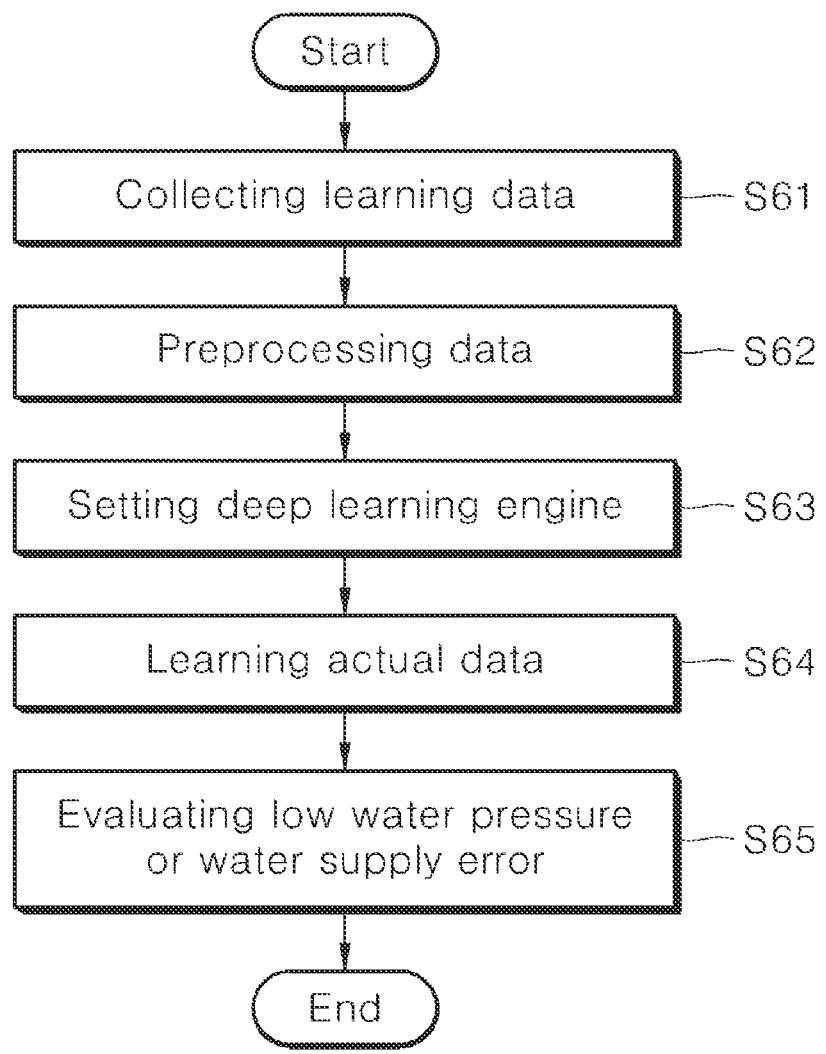
FIG. 7 shows an example learning process of a diagnostic module or a server.

FIG. 7 shows an example learning process of a diagnostic module or a server.

Learning data can be collected for various normal and abnormal conditions, which can be calculated by various electronic devices (e.g., ice water purifier refrigerators), into big data (S61). In this instance, examples of collected data can include data related to field data, e.g., a water pressure, the amount of ice making, the water supply amount and the amount of ice use, wherein these field data are related to the actual usage conditions.

Since the collected data can be collected from various types of refrigerators, a preprocessing operation for the data can be performed to standardize or normalize the data so that the diagnosis module 350 or the server 300 can learn it (S62).

In some cases, the diagnosis module 350 or the server 300 can set a deep learning engine (S63). The deep learning engine can be disposed in the diagnosis module 350 or the server 300. S63 can perform initial settings necessary for the deep learning based on the above-described data. Hence, the deep learning can be performed by repeating a process of learning based on actual data (S64) and a process of evaluating whether a low water pressure or poor water supply occurs (S65).

When learning is repeated based on data of a sufficient size, the diagnosis module 350 configured to diagnose abnormality, or the server 300 may determine a criterion (or a reference value) for determining an error based on the input data. For this purpose, the diagnosis module 350 or the server 300 may reflect previously received data such as the water pressure data, the water supply amount, the amount of ice making, or the amount of ice usage of the electronic devices for which service inspection was previously requested due to an error.

The server 300 can design a deep learning-based engine that is suitable for time-series data analysis and learning to diagnose a normal state and an abnormal state after preprocessing, and implement the deep learning-based engine to learn actual data, so that it may derive a necessary reference value. Similarly, a deep learning-based diagnosis model that is suitable for determining various causes of an error may derive necessary reference values based on error data learning.

Figure 8:
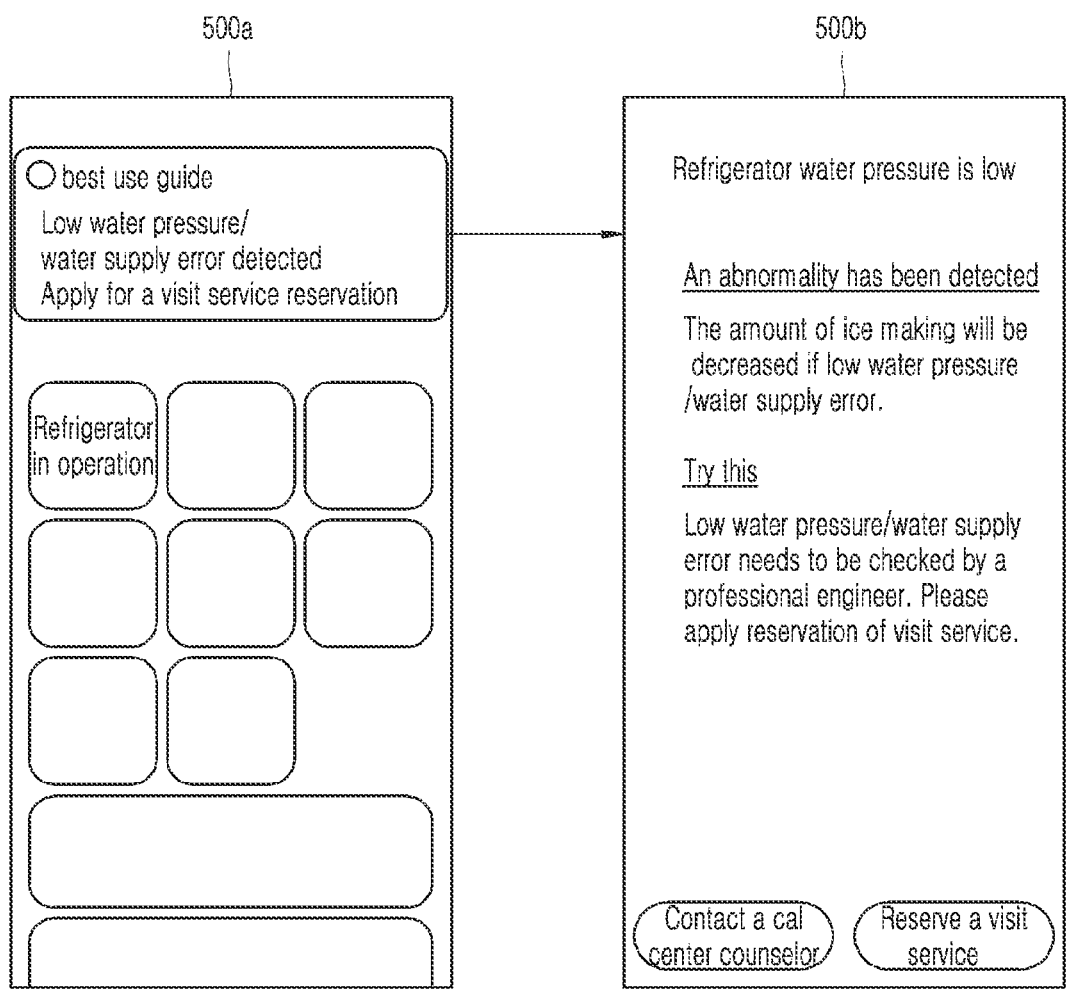
FIG. 8 shows an example process implemented when a user terminal receives a push message related to a low water pressure or poor water supply.

FIG. 8 shows an example process implemented when a user terminal receives a push message related to a low water pressure or poor water supply. The user terminal linked to an electronic device (e.g., an ice making water purifier, a refrigerator, or a water purifier) in which a low water pressure or poor water supply has occurred may receive a push message. As a result, the user terminal may output a push message indicating that a low water pressure or poor water supply has been detected as shown in 500a.

When the user receives the push message, detailed information can be displayed as shown in 500b. When the user selects to connect to a call center counselor, a phone number of the call center may be displayed and the user terminal may make a call.

When the user selects a visit service reservation, the user terminal can display a reservation screen so that the user can input a schedule (e.g., date, time, etc.) to receive the visit service.

In the process of connecting a call center counselor, booking a visit service or performing an actual visit service, the above-mentioned low water pressure/poor water supply-related information (e.g., low water pressure information, water supply amount information, etc.) can be transmitted to the service center device 100. A repair/inspection service (after-sales service) staff who used the service center device 100 can recognize an exact problem in the error of the electronic device 200, so that the quality of the repair-inspection service may be improved.

Figure 9:
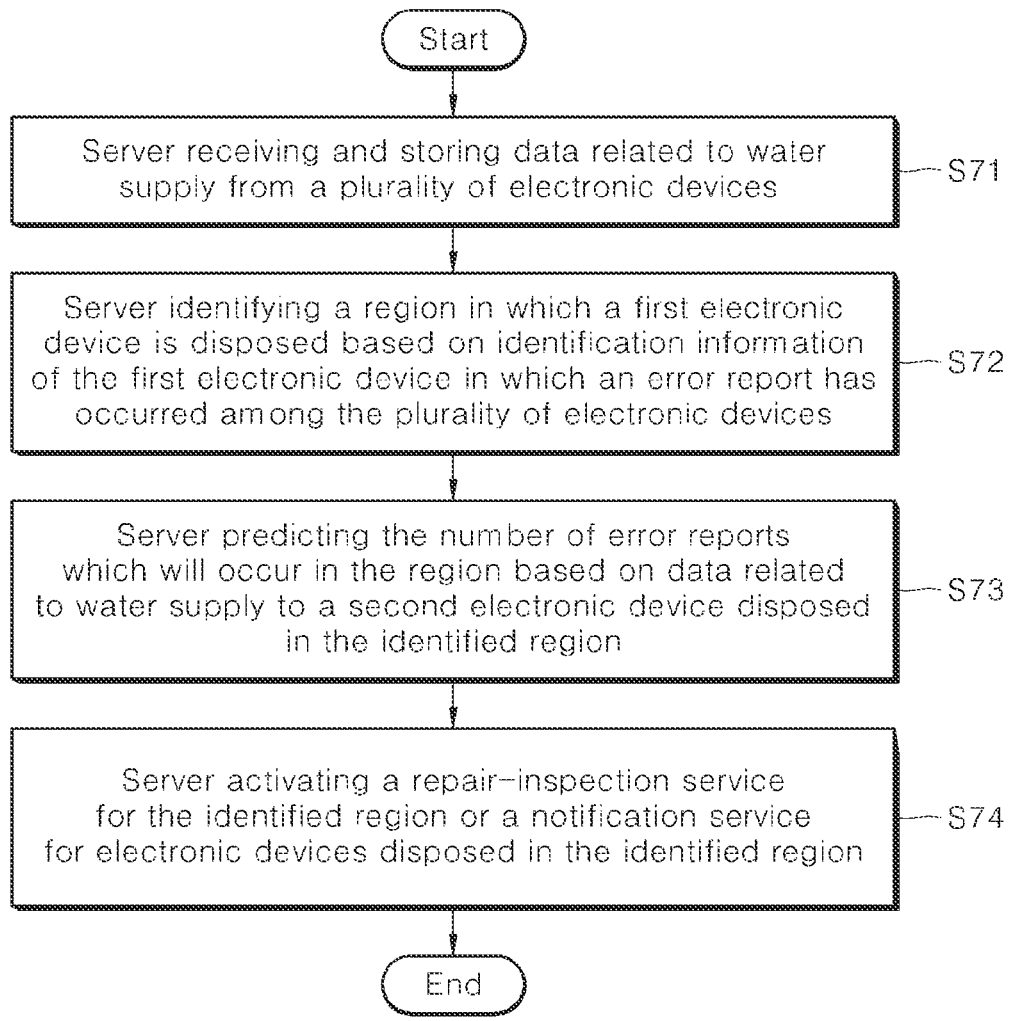
FIGS. 9 and 10 show an example process of diagnosing a device having an ice making function based on local information.
Figure 10:
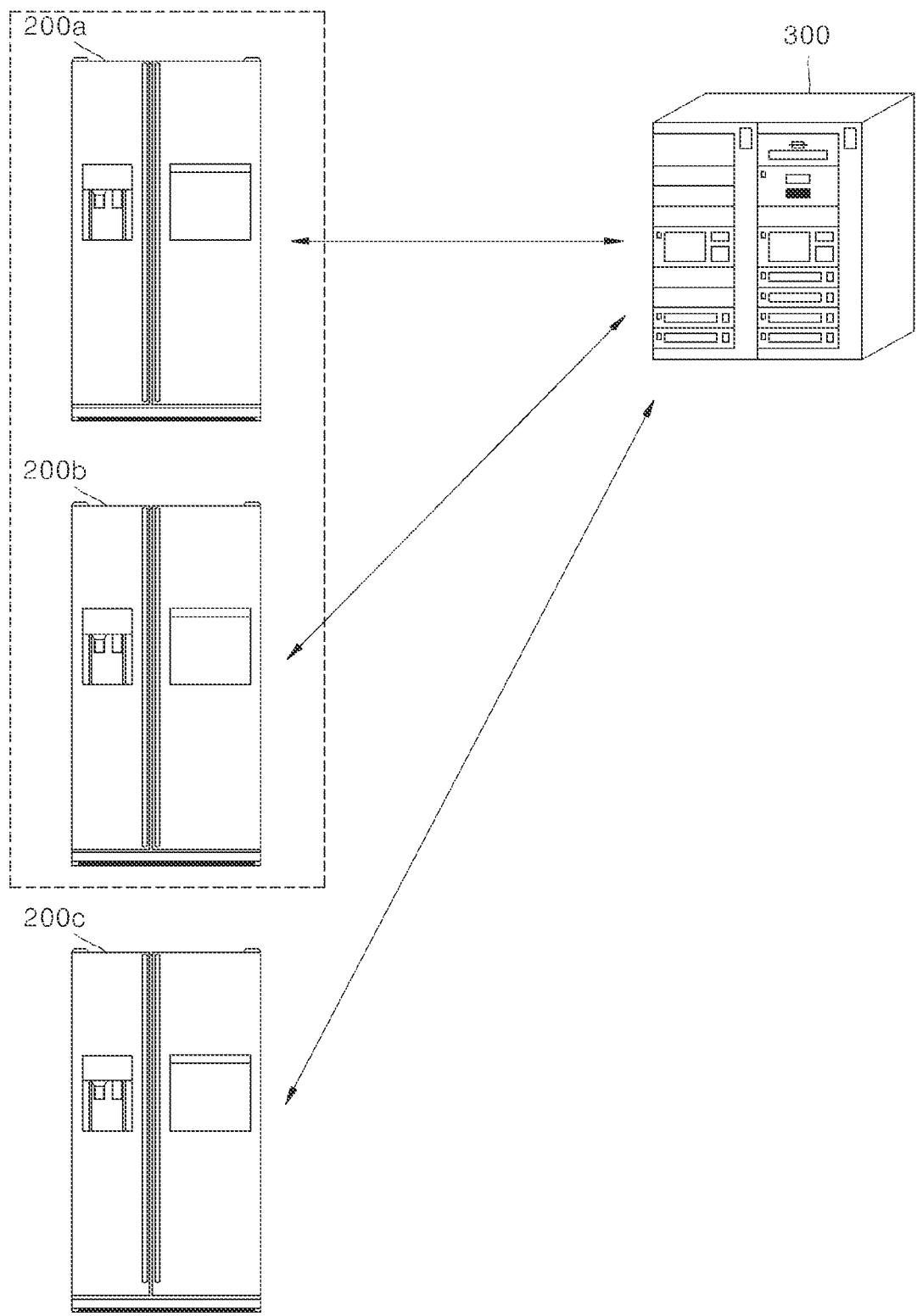

FIGS. 9 and 10 show an example process of diagnosing a device having an ice making function based on local information.

In some implementations, the server 300 can receive and store water supply-related data from a plurality of electronic devices 200 (S71). The server 300 can confirm the region of a first electronic device 200a based on identification information of the first electronic device 200a in which an error report has occurred among the plurality of electronic devices 200 (S72).

In some cases, the server 300 can predict the number of error reports that will occur in the region based on the water supply-related data of a second electronic device 200b disposed in the same identified region (e.g., the same apartment complex) (S73). The server 300 can activate a repair-inspection service for the identified region or a notification service for the electronic devices 200a and 200b disposed in the identified region (S74). Here, electronic device 200c can be used in a different region and it may not be included in the notification service provided by the server 300.

If there is a sudden change in a water pressure or water supply, it is most likely a problem with the region or apartment complex. The server 300 can monitor and respond to a specific case.

In FIG. 9, the region can include the address of the apartment complex and the server 300 can further include selecting water pressure data or water supply amount data from the water supply-related data transmitted by the plurality of electronic devices 200a and 200b in response to reports of errors that have occurred in a plurality of electronic devices 200a and 200b disposed in the same apartment complex.

The activation of the repair-inspection service of S74 can include allocating resources to be provided to the repair-inspection service based on the number of error reports previously predicted by the server 300. For example, the server 300 may adjust the schedule of home visit service (or after-sales service) staffs.

In some implementations, the server 300 can perform analysis of the customer requesting the visit service for the low water pressure environment. In addition, the server 300 can match the analyzed data and error occurrence state, thereby analyzing the data characteristics.

In some cases, the results of experiments conducted offline under the same conditions can be included in the analysis data. Accordingly, the server 300 can define criteria of a main cause and fundamental customer inconvenience, and then diagnose each device based on the defined criteria.

The server 300 can statistically accumulate and store data including the amount of the water/ice used by the customer using the electronic device 200 and compare the amount of currently made ice to the amount of ice usually used by the customer, thereby diagnosing problem situations. The server can compare the time point when users report an error to the stored data on the electronic device 200 such as an ice making purifier refrigerator used by the corresponding user, and reset the reference values (e.g., a water pressure value and a water supply amount value) used in the diagnosis process based on a result of comparison, thereby improving the accuracy of diagnosis.

Even though all the components of the implementations in the present disclosure are described as being combined into one component or operating in combination, implementations are not limited to the implementations set forth herein, and all the components can be selectively combined to operate within the scope of the purpose of the disclosure. All the components can be respectively implemented as an independent hardware, or some or all of the components can be selectively combined and can be implemented as a computer program including a program module that performs some or all functions combined into one or more hardwares. Codes or code segments of the computer program can be easily inferred by those skilled in the art. The computer program can be stored in a computer-readable recording medium and can be read and executed by a computer, whereby the implementations in the disclosure can be realized. Examples of a storage medium of the computer program include storage mediums including a magnetic recording medium, an optical recording medium and a semiconductor recording element. The computer program for realizing the implementations in the disclosure includes a program module which is transmitted via an external device in real time.

The implementations are described above with reference to a number of illustrative implementations thereof. However, the present disclosure is not intended to limit the implementations and drawings set forth herein, and numerous other modifications and implementations can be devised by one skilled in the art. Further, the effects and predictable effects based on the configurations in the disclosure are to be included within the range of the disclosure though not explicitly described in the description of the implementations.

What is claimed is:

1. A method of diagnosing an electronic device having an ice making function, the method comprising:
   receiving, by a server, data related to water supply and ice making from the electronic device;
   based on receiving the data, checking, by the server, one or more of water pressure state, an ice making state, or an ice usage state of the electronic device;
   based on the checked state, diagnosing, by the server, the electronic device to be in a low water pressure state or an insufficient water supply state;
   based on the diagnosis, activating, by the server, a repair-inspection service for the electronic device, or providing a notification service to a user terminal corresponding to the electronic device; and
   based on a water supply error rate of an ice maker disposed in the electronic device being lower than a reference error rate, ending, by the server, the diagnosing of the electronic device.

2. The method of claim 1, further comprising:
   based on an operation time of an ice maker disposed in the electronic device, determining, by the server, whether to proceed to the checking one or more of water pressure state, an ice making state, or an ice usage state of the electronic device.

3. The method of claim 1, wherein the diagnosing comprises,
   comparing, by the server, a water pressure of water supplied to the electronic device to a reference water pressure, and
   based on the water pressure being lower than the reference water pressure, diagnosing, by the server, the electronic device to be in a low water pressure state.

4. The method of claim 3, further comprising:
   collecting, by the server, water pressure data that is (i) received from a plurality of electronic devices, or (ii) received within a predetermined time period wherein an error report occurred from the electronic device, and
   generating, by the server, the reference water pressure based on the collected water pressure data.

5. The method of claim 1, wherein the diagnosing comprises,
   comparing, by the server, a water supply amount of an ice maker disposed in the electronic device to a reference water supply amount, and
   based on the water supply amount being higher than the reference water supply amount, ending, by the server, the diagnosing of the electronic device.

6. The method of claim 1, wherein the diagnosing comprises,
   comparing, by the server, an amount of ice made in an ice maker disposed in the electronic device for a predetermined time period to an amount of ice used in the electronic device, and
   based on the amount of ice made being greater than the amount of ice used, ending, by the server, the diagnosing of the electronic device.

7. The method of claim 1, wherein the activating comprises,
   combining, by the server, customer information corresponding to the electronic device diagnosed to be in the low water pressure state or the insufficient water supply state; and
   providing, by the server, the combined information to a service center device.

8. A method of diagnosing an electronic device having an ice making function, the method comprising:
   receiving and storing, by a server, data related to water supply from a plurality of electronic devices;
   based on an error report occurring from a first electronic device from the plurality of electronic devices, identifying, by the server, a region in which the first electronic device is disposed;
   predicting, by the server, a number of error reports which will occur in the identified region based on data related to water supply from a second electronic device disposed in the identified region; and
   activating, by the server, a repair-inspection service or a notification service for electronic devices disposed in the identified region.

9. The method of claim 8, wherein the identified region comprises an address of an apartment complex, and
   the method further comprises:
   based on error reports occurring from electronic devices disposed in the apartment complex, receiving, by the server, data related to water pressure or data related to water supply from the electronic devices.

10. The method of claim 8, wherein the activating further comprises,
    allocating, by the server, resources to be provided to the repair-inspection service based on the predicted number of error reports.

11. A server configured to diagnose an electronic device having an ice making function comprising:
    a data loading module configured to receive data related to water supply and ice making from the electronic device;
    a diagnosis module configured, based on receiving the data, to check a water pressure state of the electronic device, an ice making state of the electronic device or an ice usage state of the electronic device, and configured, based on the checked state, to diagnose the electronic device to be in a low water pressure state or an insufficient water supply state; and a service module configured, based on the diagnosis, to activate a repair-inspection service or provide a notification service to a user terminal corresponding to the electronic device, wherein the diagnosis module is configured to compare a water supply error rate of an ice maker disposed in the electronic device to a reference error rate, and wherein the server is configured, based on the water supply error rate being lower than the reference error rate, to end the diagnosing of the electronic device.

12. The server of claim 11, wherein the diagnosis module is configured to compare a water pressure of the electronic device to a reference water pressure, and based on the water pressure being lower than the reference water pressure, diagnose the electronic device to be in a low water pressure state.

13. The server of claim 11, wherein the diagnosis module is configured to compare an amount of water supply to the ice maker of the electronic device to a reference water supply amount, and based on the amount of water supply being higher than the reference water supply amount, end the diagnosis of the electronic device.

14. The server of claim 11, wherein the diagnosis module is configured to compare an amount of ice made in the ice maker of the electronic device in a predetermined time period to an amount of ice used in the electronic device, and based on the amount of ice made being greater than the amount of ice used, end the diagnosis of the electronic device.

15. The server of claim 11, wherein the service module is configured, based on the electronic device being diagnosed to be in a low water pressure state or an insufficient water supply state, to combine customer information corresponding to the electronic device to a low water pressure diagnosis or a water supply error diagnosis, or provide the combined information to a service center device.

* * * * *